US009789621B2

(12) United States Patent
Hsu

(10) Patent No.: US 9,789,621 B2
(45) Date of Patent: Oct. 17, 2017

(54) TUBULAR CLAMP MODULE AND SYSTEM THEREOF FOR ROLL MATERIAL CUTTING MACHINE

(71) Applicant: CHAN LI MACHINERY CO., LTD., Taoyuan (TW)

(72) Inventor: Chi-Pin Hsu, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 0 days.

(21) Appl. No.: 14/977,799

(22) Filed: Dec. 22, 2015

(65) Prior Publication Data

US 2016/0368158 A1 Dec. 22, 2016

(30) Foreign Application Priority Data

Jun. 18, 2015 (TW) ............................ 104119811 A

(51) Int. Cl.

| | |
|---|---|
| ***B23Q 3/08*** | (2006.01) |
| ***B26D 7/02*** | (2006.01) |
| ***B25B 5/06*** | (2006.01) |
| ***E04G 1/24*** | (2006.01) |
| ***B26D 7/06*** | (2006.01) |
| ***B25H 1/08*** | (2006.01) |
| ***B25B 5/14*** | (2006.01) |
| *B26D 3/16* | (2006.01) |

(52) U.S. Cl.

CPC ................ *B26D 7/02* (2013.01); *B25B 5/061* (2013.01); *B25B 5/147* (2013.01); *B25H 1/08* (2013.01); *B26D 7/0633* (2013.01); *B26D 7/0683* (2013.01); *E04G 1/24* (2013.01); *B26D 3/16* (2013.01); *B26D 2210/11* (2013.01)

(58) Field of Classification Search

USPC ............................................................ 269/25

See application file for complete search history.

(56) References Cited

U.S. PATENT DOCUMENTS 4,977,803 A * 12/1990 Blom .................. B23D 47/042 198/693

5,458,033 A * 10/1995 Wierschke .............. B26D 3/16 198/471.1

(Continued)

FOREIGN PATENT DOCUMENTS

IT EP 2921269 A1 * 9/2015 ............... B26D 7/02

IT WO 2016124297 A1 * 8/2016 ............... B65H 1/08

*Primary Examiner* — Larry E Waggle, Jr.

*Assistant Examiner* — Alvin Grant

(74) *Attorney, Agent, or Firm* — Rosenberg, Klein & Lee

(57) ABSTRACT

The present invention relates to a tubular clamp module and a system thereof, and in particular, to a tubular clamp module and a system thereof applicable to a roll material cutting machine. In the tubular clamp module of the present invention, a slope is disposed at a top end of a support, and support rods slide on the slope to support tubular plates to form an appropriate radian, so as to provide a desirable tubular clamping force in combination with the force applied by a pressing belt. In the tubular clamp system of the present invention, a plurality of tubular clamp modules is used and various driving wheels and driving belts are disposed to enable synchronous adjustment of the positions of the support rods and the length of the pressing belt, so as to rapidly complete clamping of rolls having different diameters and provide a desirable tubular clamping force.

12 Claims, 7 Drawing Sheets

(56) References Cited

U.S. PATENT DOCUMENTS

| | | | | |
|---|---|---|---|---|
| 7,946,205 | B2 * | 5/2011 | Benvenuti | B26D 5/00 83/102 |
| 2002/0078811 | A1 * | 6/2002 | Moss | B26D 7/02 83/465 |
| 2003/0015077 | A1 * | 1/2003 | Betti | B26D 3/16 83/100 |
| 2003/0167887 | A1 * | 9/2003 | Butterworth | B26D 3/16 83/27 |
| 2010/0187740 | A1 * | 7/2010 | Orgeron | B25B 5/061 269/218 |
| 2012/0204691 | A1 * | 8/2012 | Gambini | B26D 7/02 83/84 |

* cited by examiner

TUBULAR CLAMP MODULE AND SYSTEM THEREOF FOR ROLL MATERIAL CUTTING MACHINE

BACKGROUND

Technical Field

The present invention relates to a tubular clamp module and a system thereof, and in particular, to a tubular clamp module and a system thereof applicable to a roll material cutting machine.

Related Art

FIG. 1A to FIG. 1C are schematic diagrams of operations of a conventional tubular clamp system and modules thereof. As shown in the drawings, the conventional tubular clamp system 10 for a roll material cutting machine includes a plurality of tubular clamp modules 12, an upper adjustment plate 161, a lower adjustment plate 163, and a turnplate 181.

Each tubular clamp module 12 includes a pair of supports 121, a pair of splints 123, a pair of tubular plates 125, a pair of mandrils 127, and a pressing belt 129. The supports 121 are disposed on a platform 101 of the roll material cutting machine in an opposite manner. The tubular plates 125 are each disposed at a top end of the support 121, and tail ends thereof are overlapped and slidable. The pressing belt 129 crosses over the tubular plates 125, and can apply forces downward by two ends, so as to provide a tubular radial clamp force by using the tubular plates 125. The splints 123 are each pivoted to an upper portion of the support 121, and are driven by the mandrils 127 to rotate, so as to change the radian of the tubular plates 125 by different clamping angles, which is conducive to clamping rolls 105 having different diameters.

Bottom ends of each pair of the mandrils 127 are respectively pivoted to the upper adjustment plate 161 and the lower adjustment plate 163. The upper adjustment plate 161 and the lower adjustment plate 163 are overlapped under the platform 101, and moving ranges of the upper adjustment plate 161 and the lower adjustment plate 163 are limited by using a bracket 103. The upper adjustment plate 161 and the lower adjustment plate 163 are respectively connected to the turnplate 181 through an upper connecting rod 183 and a lower connecting rod 185, and when the turnplate 181 is rotated, the upper adjustment plate 161 and the lower adjustment plate 163 are driven to move in an opposite direction, so as to change an angle of clamping the tubular plates 125 by driving the splints 123 to open or close.

By using the structure of the conventional tubular clamp system 10, clamping angles of the splints 123 of each tubular clamp module 12 are adjusted when cutting the rolls 105 having different diameters of different batches, so as to be conducive to clamping the rolls 105 having different diameters for cutting. However, in the prior art, the opening and closing angle of the splints 123 is adjusted by using the upper adjustment plate 161, the lower adjustment plate 163, and the mandrils 127, the upper adjustment plate 161 and the lower adjustment plate 163 can merely move horizontally due to the limit of the bracket 103, and the mandril 127 needs to rotate by using a rotation shaft of the splint 123 as an axis, so that during adjustment, extra extrusion and friction may be generated between the upper adjustment plate 161 and the lower adjustment plate 163 and between the lower adjustment plate 163 and the bracket 103, which easily causes damage of a mechanical component.

The tubular clamp system 10 clamps the tubular plate 125 by using different opening and closing angles of the splints 123, so as to adjust the radian of the tubular plate 125. Therefore, when the roll 105 has a large diameter, the opening angle of the splints 123 is large, and points of clamping the tubular plate 125 are relative low. When the diameter of the roll 105 is small, the opening angle of the splints 123 is small, and points of clamping the tubular plate 125 are relatively high, so that stress is easily concentrated to a lower portion of the roll 105, thereby causing non-uniformly applied forces or causing deformation of the roll 105.

Therefore, it is a subject in urgent need to be solved in the field on how to design a preferable tubular clamp system that can rapidly adjust a diameter of a clamping tube and can provide desirable clamping effect.

SUMMARY

An objective of the present invention is to provide a tubular clamp module and a system thereof, and in particular, a tubular clamp module and a system thereof for a roll material cutting machine.

Another objective of the present invention is to provide a tubular clamp module, in which a radian of a tubular plate is adjusted by moving a support rod on a slope, so as to provide preferable support points when rolls having different diameters are clamped.

Still another objective of the present invention is to provide a tubular clamp system, in which adjustment of a plurality of tubular clamp modules can be rapidly implemented through cooperation of various driving wheels and driving belts.

The present invention provides a tubular clamp module for a roll material cutting machine, comprising: a pair of supports, a top end of each support having a slope; a pair of tubular plates, each disposed on an upper portion of the corresponding support, so that the bottom of the tubular plate is disposed adjacent to the slope, an upper end of the tubular plate being capable of sliding in an overlapped manner so as to clamp a roll; a pair of support rods, slidably disposed on the corresponding slopes respectively, for supporting the radian of the tubular plates; a pair of support rod driving wheels, respectively disposed under the corresponding supports; a pair of support rod driving belts, respectively crossing over the corresponding slopes and the support rod driving wheels, connected to the corresponding support rods, and used to drive the support rods to slide on the slopes; and a pressing belt, crossing over the tubular plates, and applying forces downward by two ends of the pressing belt, thereby providing a tubular radial clamp force by using the tubular plates.

In an embodiment of the present invention, the slopes of the supports are inclined inward and downward from the outside.

In an embodiment of the present invention, the support rod driving wheels are linked inversely, so as to drive the support rods to move inward or outward simultaneously.

In an embodiment of the present invention, one end of the pressing belt is secured to a fixing point, and the other end of the pressing belt applies a force downward.

In an embodiment of the present invention, each support rod driving wheel is implemented as a gear, and each support rod driving belt is implemented as a chain.

The present invention further provides a tubular clamp system for a roll material cutting machine, comprising: a plurality of tubular clamp modules as claimed in claim 1, respectively used to clamp a roll, wherein one end of each pressing belt is secured to a fixing point; a pressing belt driving wheel, connected to the other end of each pressing belt, and used to provide a downward force to each pressing belt; and a support rod linkage belt, crossing over each support rod driving wheel, and used to drive each pair of support rod driving wheels to rotate inversely.

In an embodiment of the present invention, the tubular clamp system further comprises a main driving wheel, used to drive the pressing belt driving wheel and one of the support rod driving wheels to rotate respectively through a pressing belt power belt and a support rod power belt.

In an embodiment of the present invention, the tubular clamp system further comprises a pressing belt frame, connected to the other end of each pressing belt; and a pressing belt driving belt, having one end disposed on the pressing belt driving wheel, and the other end connected to the pressing belt frame.

In an embodiment of the present invention, the tubular clamp system further comprises a plurality of pneumatic cylinders, each disposed between one end of the corresponding pressing belt and the fixing point.

In an embodiment of the present invention, the tubular clamp system further comprises a plurality of auxiliary wheels used to assist changing of paths of the pressing belts.

In an embodiment of the present invention, the slopes of each pair of supports are inclined inward and downward from the outside.

In an embodiment of the present invention, each driving wheel is implemented as a gear, and each driving belt and each linkage belt are respectively implemented as a chain.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1A:
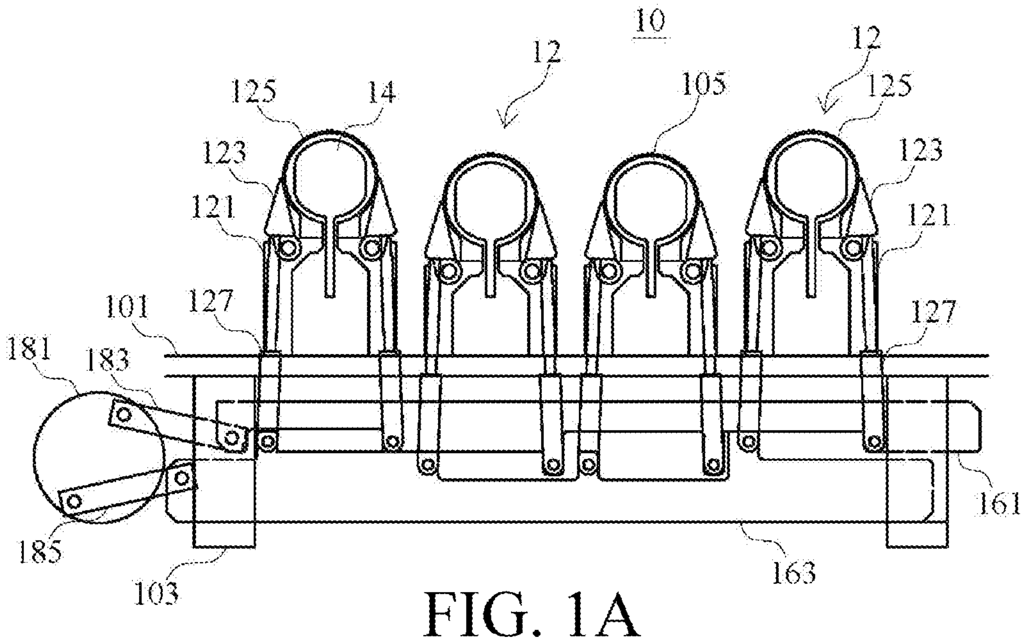
FIG. 1A (Prior Art)
FIG. 1A to FIG. 1C are schematic diagrams of operations of a conventional tubular clamp system and modules thereof.
Figure 1B:
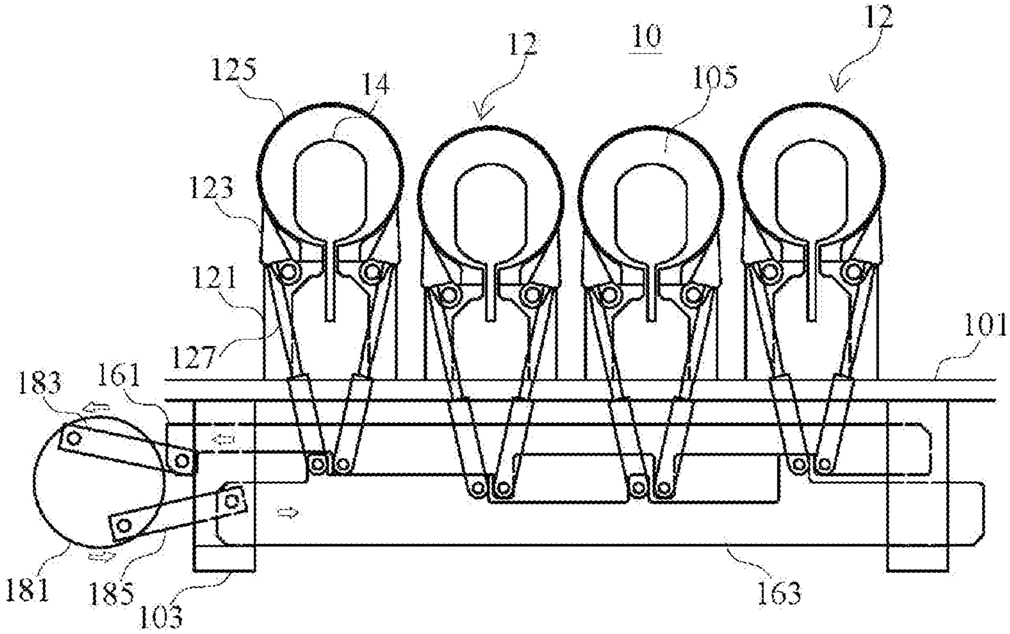
FIG. 1B (Prior Art)
Figure 1C:
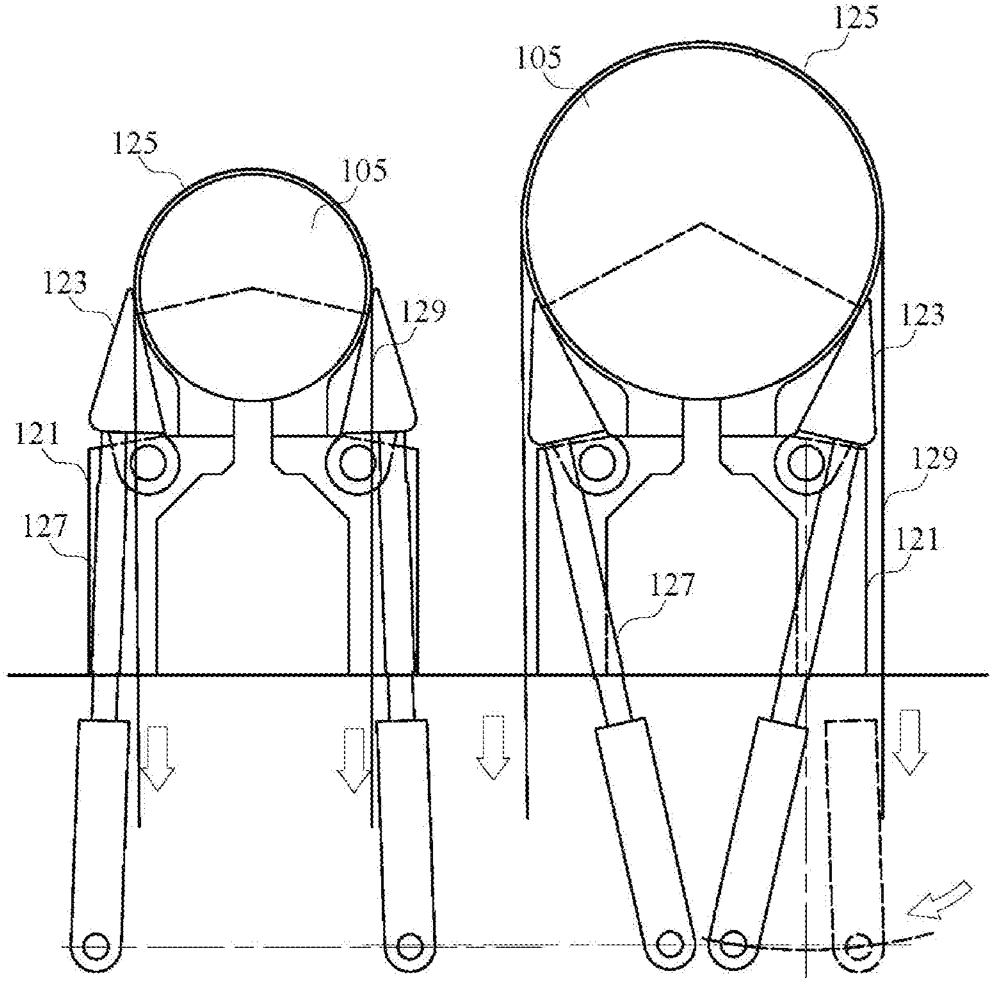
FIG. 1C (Prior Art)
Figure 2:
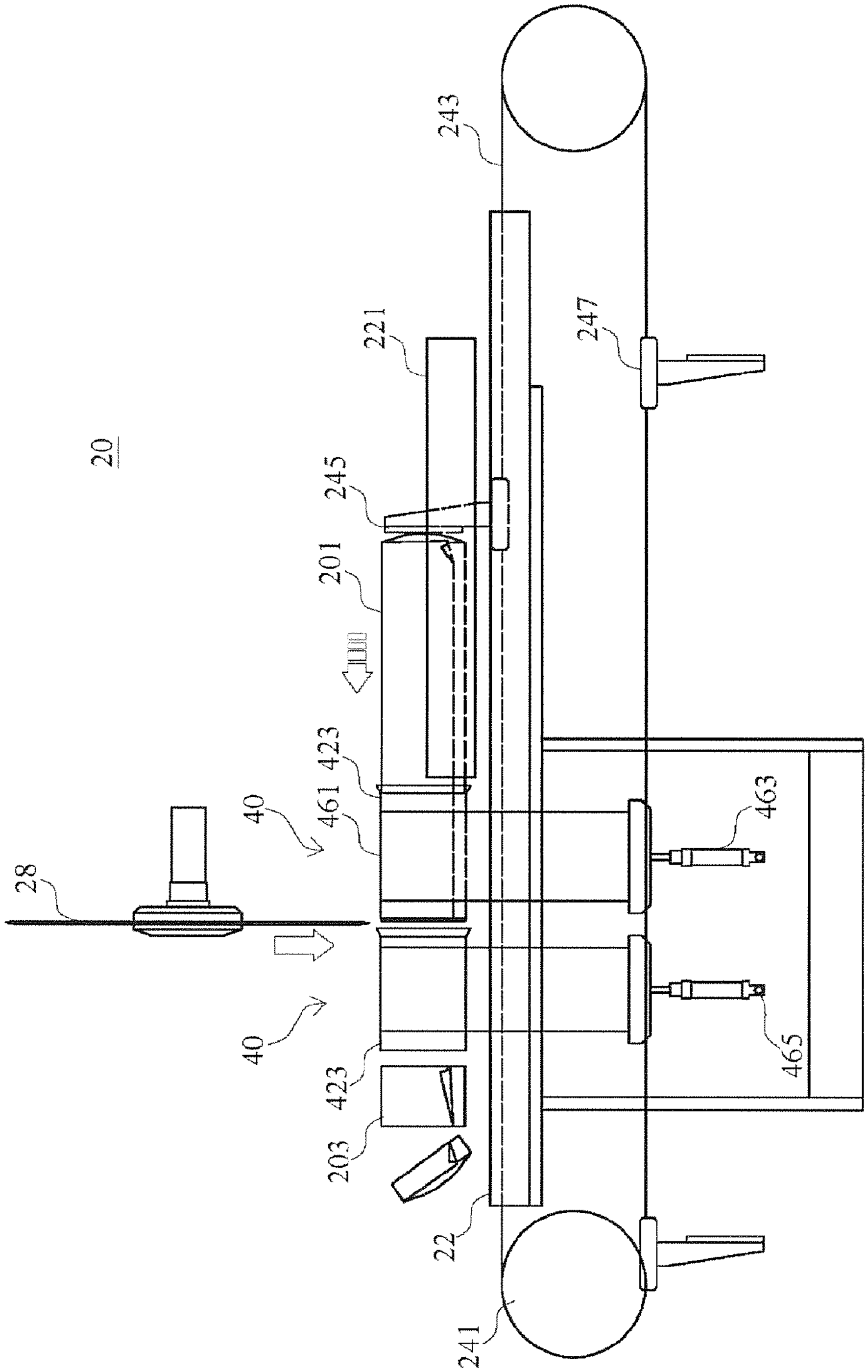
FIG. 2 and FIG. 3 are respectively a schematic structural diagram and a schematic operating diagram of an embodiment of a roll material cutting machine according to the present invention.
Figure 3:
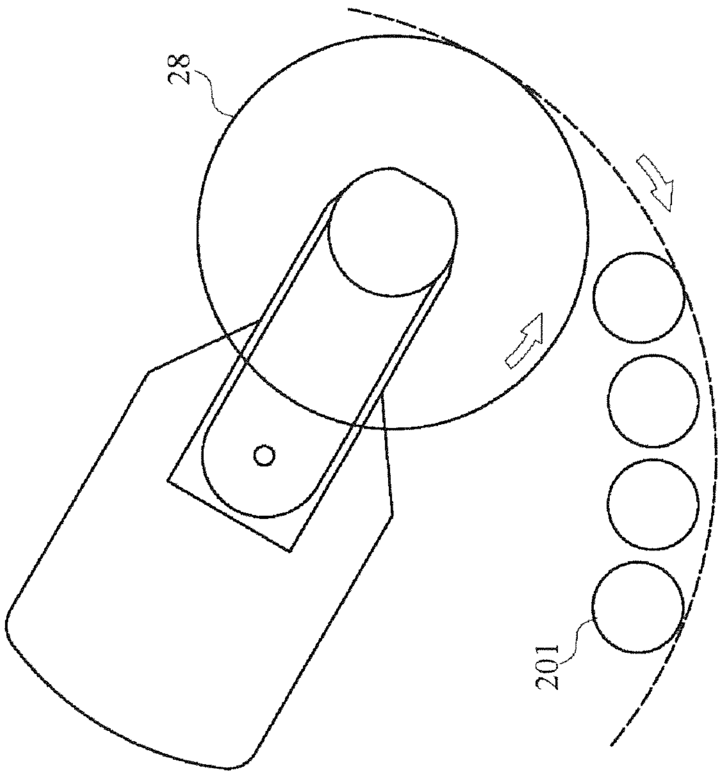

FIG. 2 and FIG. 3 are respectively a schematic structural diagram and a schematic operating diagram of an embodiment of a roll material cutting machine according to the present invention. As shown in the drawings, the roll material cutting machine 20 of the present invention includes a plurality of tubular clamp modules 40, a platform 22, a plurality of pairs of push plate driving rollers 241, a plurality of push plate driving belts 243, a plurality of push plates 245, and a cutter 28.

The tubular clamp modules 40 are disposed in parallel on the platform 22, and are respectively used to clamp a roll 201. The platform 22 is provided with a plurality of guide slots 221 used to bear and guide each roll 201. The push plate driving rollers 241 are respectively disposed at a front end and a rear end of the platform 22, and the push plate driving belts 243 respectively cross over the push plate driving rollers 241 and the platform 22. The push plates 245 are respectively secured to the push plate driving belt 243 and driven by the push plate driving belt 243 to move from the rear end of the platform 22 toward the front end, and push the rolls 201 to move through the guide slots 221.

When the rolls 201 are moved to set positions, the tubular clamp modules 40 clamp the rolls 201, and the cutter 28 cuts the rolls 201 to form products 203. After the cutting, when the cutter 28 rises, the tubular clamp modules 40 release the rolls 201, the push plates 245 push the rolls 201 to move forward by a set distance, and clamping and cutting are performed once again, thereby forming a circulation.

In an embodiment of the present invention, two groups of tubular clamp modules 40 are respectively used to clamp the rolls 201 before and after a cutting point, so as to prevent the rolls 201 from being deformed at the cutting point due to the force applied by the cutter 28, thereby ensuring the quality of cutting.

Figure 4:
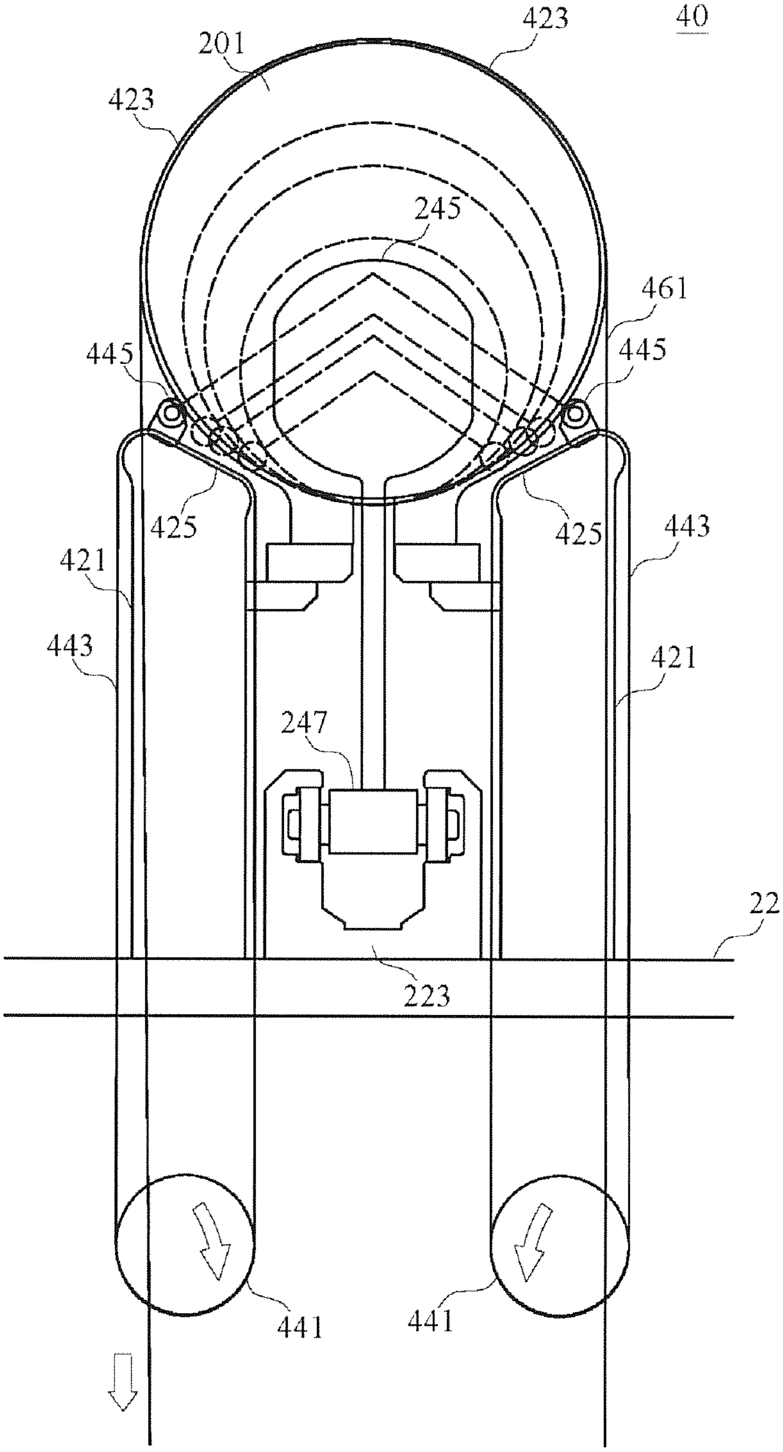
FIG. 4 is a schematic diagram of an embodiment of a tubular clamp module according to the present invention.

In an embodiment of the present invention, a sliding rail 223 (as shown in FIG. 4) may further be disposed on the platform 22, for a push plate seat 247 of the push plate 245 to pass, so as to provide a stable push force for the roll 201.

Figure 5:
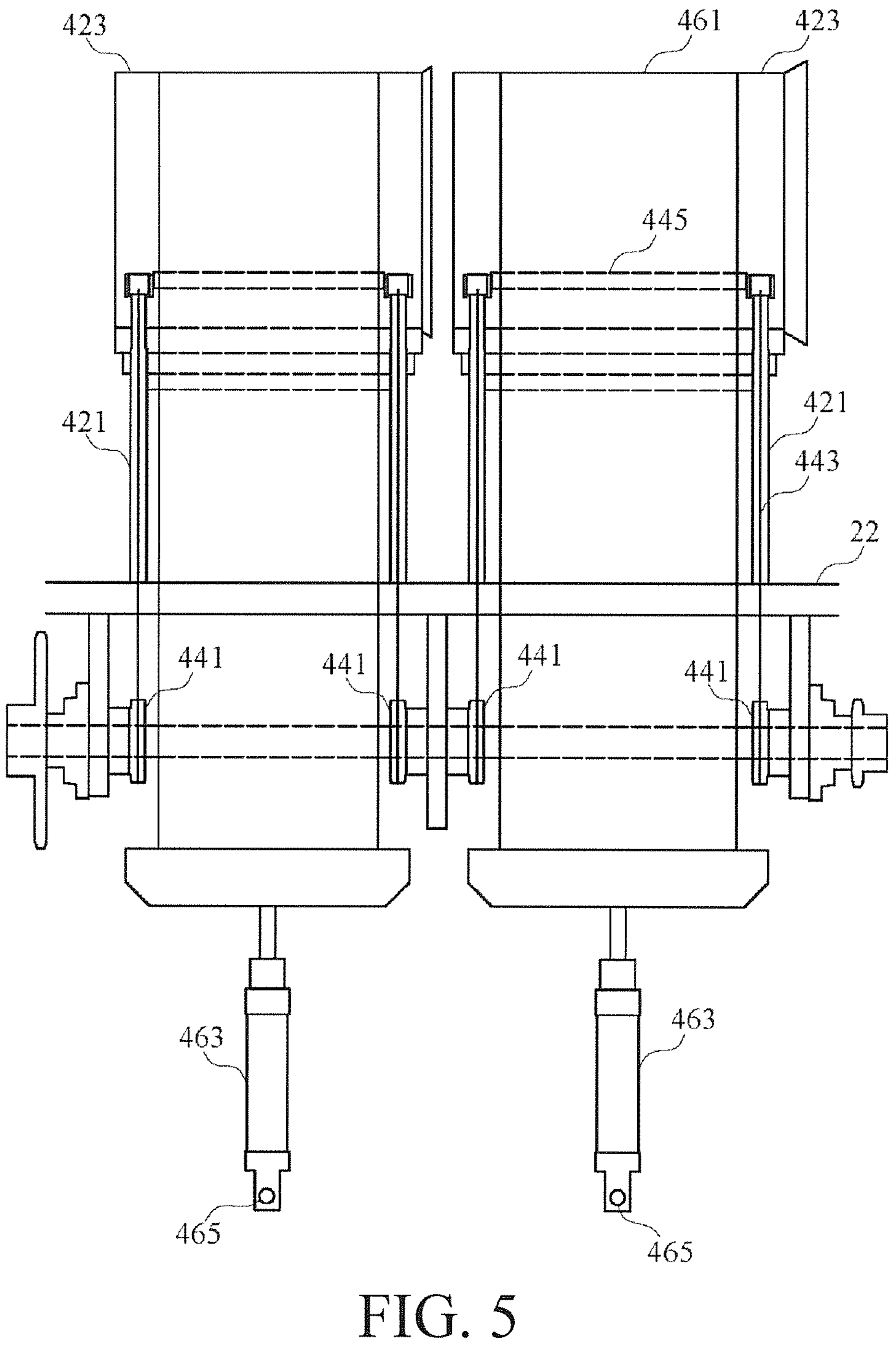
FIG. 5 is a schematic side view of an embodiment of a tubular clamp module according to the present invention.

FIG. 4 and FIG. 5 are respectively a schematic diagram and a schematic side view of a preferred embodiment of the tubular clamp module 40 according to the present invention. As shown in the drawings, the tubular clamp module 40 of the present invention includes a pair of supports 421, a pair of tubular plates 423, a pair of support rods 445, a pair of support rod driving wheels 441, a pair of support rod driving belts 443, and a pressing belt 461. The supports 421 are disposed on the platform 22, and the top end of each support 421 is provided with a slope 425. The tubular plates 423 are each disposed on an upper portion of the corresponding support 421, so that the bottom of the tubular plate 423 is disposed adjacent to the slope 425, and an upper end of the tubular plate 423 is capable of sliding in an overlapped manner to form a tubular shape for clamping the roll 201.

The support rods 445 are slidably disposed on the corresponding slopes 425 respectively, so as to support the radian of the tubular plates 423. The support rod driving wheels 441 are disposed under the corresponding supports 421 respectively. The support rod driving belts 443 cross over the corresponding slopes 425 and the support rod driving wheels 441 respectively, and are connected to the corresponding support rods 445. When the support rod driving wheels 441 rotate, the support rods 445 are driven by the support wheel driving belts 443 to slide on the slope 425, so as to change positions of supporting the tubular plates 423, thereby changing the radians of the tubular plates 423.

The pressing belt 461 crosses over the tubular plates 423, and applies forces downward by two ends of the pressing belt 461, so as to provide a tubular radial clamp force by using the tubular plates 423 and the support rods 445.

In an embodiment of the present invention, the slope 425 of each support 421 of the tubular clamp module 40 is inclined inward and downward from the outside, and through appropriate angle setting of the slope 425, in addition to supporting an appropriate radian of the tubular plate 423 when the support rod 445 moves on the slope 425, a supporting point of the support rod 445 may also maintain the same supporting angle with the axis of the roll 201, thereby providing optimal supporting and clamping effects.

In an embodiment of the present invention, each support rod driving wheel 441 moves inversely, and when any support rod driving wheel 441 rotates, it can drive the support rod 445 to move inward or outward by the same distance.

In an embodiment of the present invention, one end of the pressing belt 461 is secured to a fixing point 465, and the other end of the pressing belt 461 applies a force downward, thereby achieving the same clamping effect.

In an embodiment of the present invention, a pneumatic cylinder 463 is disposed between one end of the pressing belt 461 and the fixing point 465, so as to release or tighten the pressing belt 461 by extending or retracting the stroke of the pneumatic cylinder 463.

In an embodiment of the present invention, each support rod driving wheel 441 is implemented as a gear, and each support rod driving belt 443 is implemented as a chain.

Figure 6:
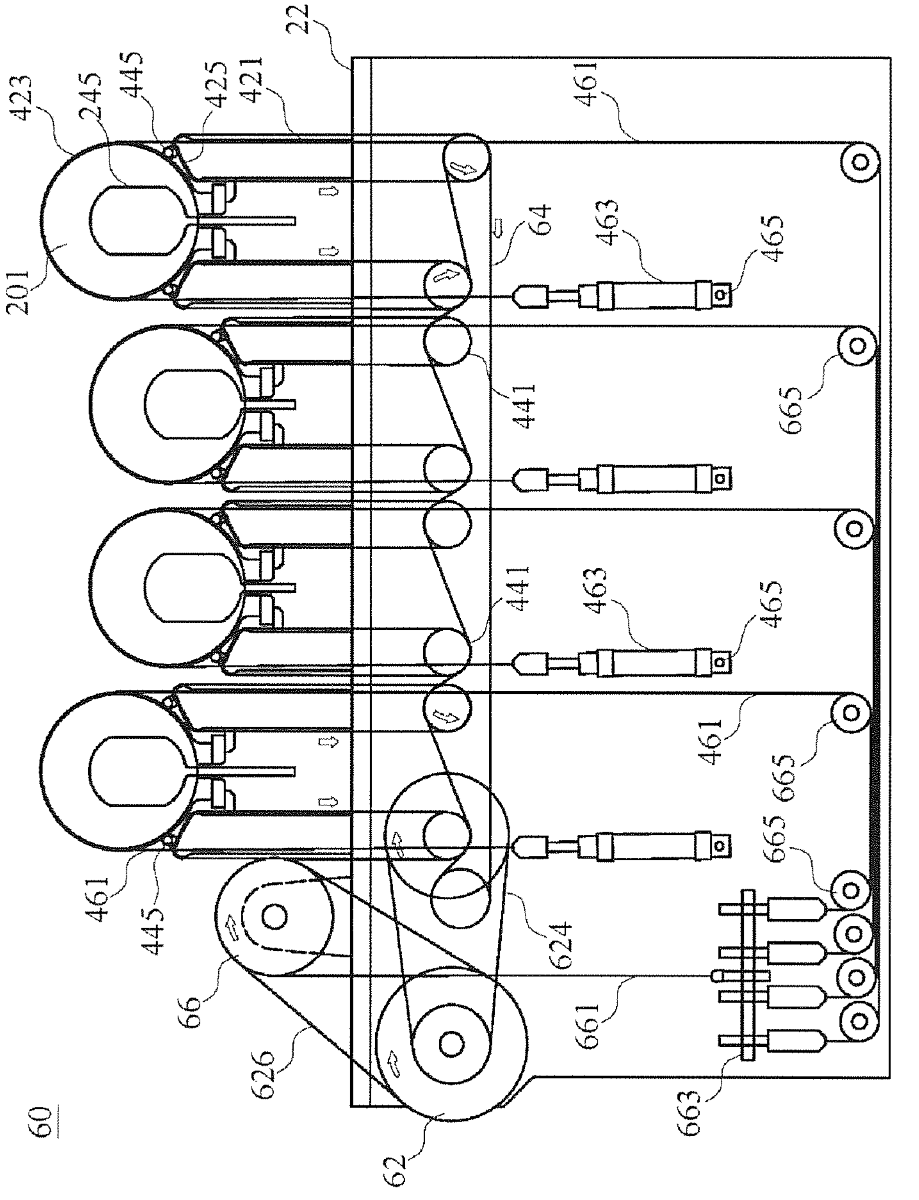
FIG. 6 is a schematic diagram of an embodiment of a tubular clamp system according to the present invention.

FIG. 6 is a schematic diagram of an embodiment of a tubular clamp system according to the present invention. As shown in the drawing, the tubular clamp system 60 of the present invention includes a plurality of tubular clamp modules 40, a pressing belt driving wheel 66, and a support rod linkage belt 64.

The tubular clamp modules 40 are disposed in parallel on the platform 22, and are respectively used for clamping a roll 201. One end of the pressing belt 461 in each tubular clamp module 40 is secured to a fixing point 465, and the other end of the pressing belt 461 is connected to the pressing belt driving wheel 66, so as to provide a downward force to the pressing belt 461 by the pressing belt driving wheel 66. The support rod linkage belt 64 crosses over the support rod driving wheels 441, so as to drive the support rod driving wheels 441 to rotate inversely.

In an embodiment of the present invention, the tubular clamp system 60 further includes a main driving wheel 62, a pressing belt power belt 626, and a support rod power belt 624. The pressing belt power belt 626 crosses over the main driving wheel 62 and the pressing belt driving wheel 66, and the support rod power belt 624 crosses over the main driving wheel 62 and one of the support rod driving wheels 441. By rotating the main driving wheel 62, lengths of the pressing belts 461 and positions of the support rods 445 can be adjusted simultaneously.

In an embodiment of the present invention, the tubular clamp system 60 further includes a pressing belt frame 663 and a pressing belt driving belt 661. The pressing belt frame 663 is connected to the other end of the pressing belt 641, one end of the pressing belt driving belt 661 is disposed on the pressing belt driving wheel 66, and the other end of the pressing belt driving belt 661 is connected to the pressing belt frame 663.

In an embodiment of the present invention, the tubular clamp system 60 further includes a plurality of auxiliary wheels 665, which can be disposed at appropriate positions to change paths of the pressing belts 461.

In an embodiment of the present invention, the tubular clamp system 60 further includes a plurality of pneumatic cylinders 463 respectively disposed between one end of the corresponding pressing belt 461 and the fixing point 465, and the pressing belts 461 may be released or tightened by extending or retracting of a stroke of the pneumatic cylinder 463. Moreover, after the tubular clamp system 60 is adjusted to be adapted to the diameter of this batch of rolls 201, the length and tightness of each pressing belt 461 are adjusted by using the pneumatic cylinder 463 in accordance with differences of the rolls 201.

In an embodiment of the present invention, the slopes 425 of each pair of the supports 421 are inclined inward and downward from the outside.

In an embodiment of the present invention, each driving wheel is implemented as a gear, and each driving belt and each linkage belt are respectively implemented as a chain.

By using the tubular clamp module 40 and the tubular clamp system 60 of the present invention, adjustment may be performed directed to diameters of various batches of rolls 201, and positions of the support rods 445 may be adjusted synchronously, thereby supporting an appropriate radian of the tubular plates 423, so as to provide optimal supporting and clamping effects.

What are described above are merely embodiments of the present invention, and are not intended to limit the implementation scope of the present invention. Equivalent variations and modifications made without departing from the shape, structure, feature, method and spirit described in the scope of the claims of the present invention shall all fall within the scope of the claims of the present invention.

What is claimed is:

1. A tubular clamp module for a roll material cutting machine, comprising:

a pair of supports, a top end of each support having a slope;

a pair of tubular plates, each tubular plate corresponding to each support and disposed on an upper portion of the corresponding support, so that a bottom of the tubular plate is disposed adjacent to the slope, an upper end of the tubular plate being capable of sliding in an overlapped manner so as to clamp a roll;

a pair of support rods, each support rod corresponding to each slope and slidably disposed on the corresponding slope respectively, for supporting a circumference of the tubular plates;

a pair of support rod driving wheels, each driving wheel corresponding to each support and respectively disposed under the corresponding support;

a pair of support rod driving belts, each support rod driving belt corresponding to each slope and support rod driving wheel, and respectively crossing over the corresponding slope and the support rod driving wheel, the pair of support rod driving belts being connected to the corresponding support rods, and used to drive the support rods to slide on the slopes; and a pressing belt, crossing over the tubular plates, and applying forces downward by two ends of the pressing belt, thereby providing a tubular radial clamp force by using the tubular plates.

2. The tubular clamp module according to claim 1, wherein the slopes of the supports are inclined inward and downward from outer sides of the supports.

3. The tubular clamp module according to claim 1, wherein the support rod driving wheels are linked inversely, so as to drive the support rods to move inward or outward simultaneously.

4. The tubular clamp module according to claim 1, wherein one end of the pressing belt is secured to a fixing point, and the other end of the pressing belt applies a force downward.

5. The tubular clamp module according to claim 1, wherein each support rod driving wheel is implemented as a gear, and each support rod driving belt is implemented as a chain.

6. A tubular clamp system for a roll material cutting machine, comprising:

a plurality of tubular clamp modules as claimed in claim 1, respectively used to clamp a roll, wherein one end of each pressing belt is secured to a fixing point;

a pressing belt driving wheel, connected to the other end of each pressing belt, and used to provide a downward force to each pressing belt; and a support rod linkage belt, crossing over each support rod driving wheel, and used to drive each pair of support rod driving wheels to rotate inversely.

7. The tubular clamp system according to claim 6, further comprising a main driving wheel, used to drive the pressing belt driving wheel and one of the support rod driving wheels to rotate respectively through a pressing belt power belt and a support rod power belt.

8. The tubular clamp system according to claim 6, further comprising:

a pressing belt frame, connected to the other end of each pressing belt; and a pressing belt driving belt, having one end disposed on the pressing belt driving wheel, and the other end connected to the pressing belt frame.

9. The tubular clamp system according to claim 6, further comprising a plurality of pneumatic cylinders, each disposed between one end of the corresponding pressing belt and the fixing point.

10. The tubular clamp system according to claim 6, further comprising a plurality of auxiliary wheels used to assist changing of paths of the pressing belts.

11. The tubular clamp system according to claim 6, wherein the slopes of each pair of supports are inclined inward and downward from the outside.

12. The tubular clamp system according to claim 6, wherein each driving wheel is implemented as a gear, and each driving belt and each linkage belt are respectively implemented as a chain.

* * * * *